Patented July 15, 1947

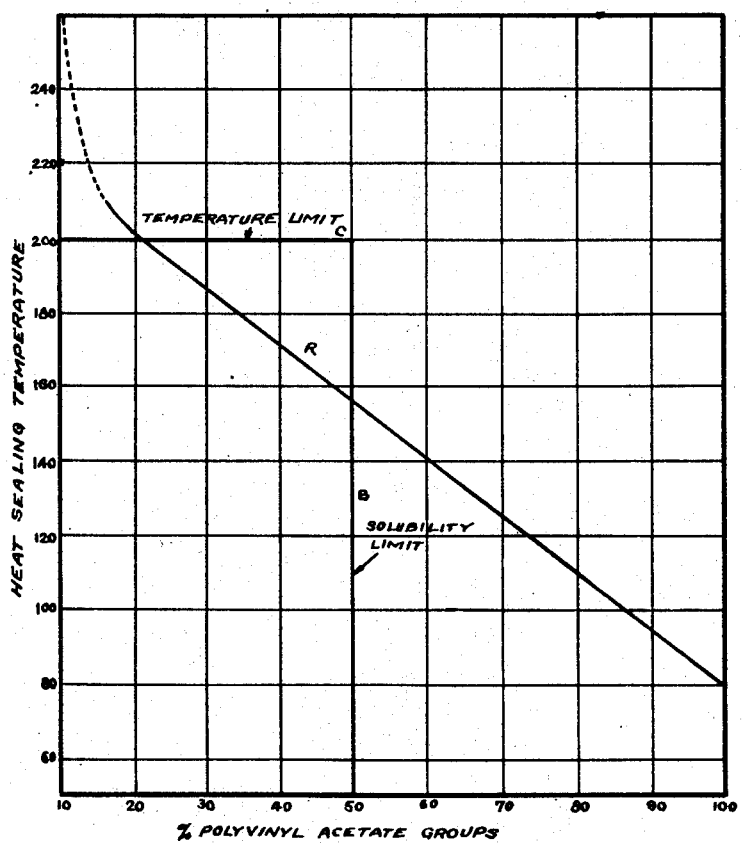

2,424,110

UNITED STATES PATENT OFFICE 2,424,110

HEAT SEALING WITH PARTIALLY HYDROLYZED POLYVINYL ACETATE

George Osman Morrison and Thomas Patton Gladstone Shaw, Shawinigan Falls, Quebec, Canada, assignors to Shawinigan Chemicals Limited, Montreal, Quebec, Canada, a corporation of Canada Application November 9, 1942, Serial No. 465,064
In Canada August 27, 1942

6 Claims. (Cl. 154—138)

Introduction

This invention relates to the manufacture of products made from cellulosic sheet material, having areas coated with a heat-sealing material. Among products of this type are containers of paper, cardboard, and textile fabrics, which have sealing flaps adapted to be overlapped and bonded together.

It is desirable in the manufacture of products of this nature that the bonding material be suitable for application in the absence of volatile solvents, that bonding the accomplished by a simple heat-sealing step at moderate temperatures and that the resulting bond be sufficiently strong and durable to withstand strenuous usage. Many resins otherwise suitable require volatile solvents for their application and besides are deteriorated by greases and oils and so are useless as applied to containers of oleaginous materials. Usually glues are not sufficiently flexible to withstand bending and creasing which the sealing areas of containers may encounter.

Objects

Having regard to the foregoing, objects of the present invention are to provide:

A new and improved heat-sealing product of sheet material.

A product of this nature in which the heat-sealing coating avoids the disadvantages of prior art coatings.

A product having a coating resistant to oleaginous materials and sufficiently tough to withstand flexure without cracking.

A product of this nature having a bondable area which can be heat-sealed to an area of another sheet by the simple application of heat and pressure.

Simple steps for the manufacture of such products.

These objects and others are achieved according to the present invention by providing in products made from sheet materials, areas coated with hydrolyzed polyvinyl acetates of a water soluble fusible type. This material is applied in any suitable manner from aqueous solution, leaving on evaporation of the solvent, a stable, flexible film of resin. Bonding is accomplished by juxtaposing the coated area with the material to which it is to be bonded and applying heat and pressure. In this way a bonded article is made, having an extremely durable bond securing it together.

Bonding material

These hydrophilic fusible partially hydrolyzed polyvinyl acetates are those having a polyvinyl acetate group content in the approximate range of 20% to 50% by weight. Below about 20% the products become infusible at temperatures low enough for use in connection with paper or similar products. Above about 50% they become water insoluble.

This is well illustrated in the drawing which is a graph in which percent acetate groups in the resins is denoted on the abscissae, temperatures on the ordinates. The line A is a curve indicating the approximate temperatures at which the partially hydrolyzed polyvinyl acetates of various acetate group contents are heat-sealing. The line B is in the region of the practical limit of water solubility and the line C substantially the highest practical heat-sealing temperature. Useful resins, therefore, are those having an acetate group content defined approximately by the section of the line A between the respective points of its inter-section by the lines B and C. The preferred range of polyvinyl acetate group content is between about 25% and about 35% by weight.

In the preparation of these hydrolysis products, the hydrolysis may be either acid or alkaline, substantially as taught by the prior art and the accompanying examples. It is essential, however, that the catalyst and the polyvinyl acetate be mixed thoroughly in the shortest possible time, e. g., so as to avoid local reaction. Other conditions are substantially those normally observed in the hydrolysis of polyvinyl acetates.

Other groups such as acetal, ketal, may be present in small proportions without detracting appreciably from the desired properties. The range of viscosity of the starting polyvinyl acetate should be such that the partially hydrolyzed product is of such a viscosity that it can be made into a solution of suitable viscosity for spreading. The preferred range of starting polyvinyl acetate is from about 1 to about 100 centipoises, determined as well known in the art. The resin may be plasticized with any plasticizer of the kind usually employed with partially hydrolyzed polyvinyl ester type resins, as for instance, glycerol, diacetin, diethanolamine and monacetin, etc.

The heat-sealing coating may be applied to the sealing areas of the product from an aqueous solution of the resin of a concentration suitable for application by brushing, spraying or in any other convenient manner. Normally, the coating is applied directly to the material to be bonded, but if this material is highly porous a suitable coagulating agent for the resin, as for instance, chromates, borates, etc., may first be applied to reduce penetration of the material. When the solvent evaporates there remains a dry flexible coating of the resin which resists abrasion and other conditions tending to remove it from the surface to which it is applied.

The bond is effected by juxtaposing the heat-sealing area of the product with the area of the material to which it is to be applied and applying effective heat and pressure. This fuses the resin and causes it to adhere to both the surfaces being bonded to such an extent that these surfaces cannot be separated without rupture of the bonded materials. Where paper and cardboard are bonded the strength of the bond is much greater than the tensile strength of these materials.

The coating is heat-sealing in less than one-half a minute within temperature ranges of about 150° C. and about 200° C. or if plasticized, somewhat lower. This range naturally depends greatly upon the equipment employed, the time and the pressure. In any case, the heat temperature, time and pressure factors must be effective to fuse the resin without decomposing it or deteriorating the material which is being joined. Coatings may be applied to paper, cardboard, felts, regenerated cellulose sheet, textile materials, or other cellulosic sheet materials, thus providing articles bonded or bondable by the mere application of sufficient heat and pressure to fuse the coating and heat-seal it. The joint thus formed is extremely strong and where the bonded material permits, flexible. Particularly useful examples of this type of article are containers, especially those made of paper, cardboard and similar cellulosic materials and used for oleaginous materials. The joints of these containers, manufactured according to the invention, are sufficiently flexible and tough to withstand without cracking, the flexure that is often encountered in manufacture and use. At the same time, the resinous material resists the oleaginous contents and has no undesirable odour- or taste-giving properties.

Examples

The following examples in which characteristic procedures are set forth make the invention understood in a more specific sense. These examples should not be taken as limiting the scope of the disclosure.

Example 1

45 grams of polyvinyl acetate, having a viscosity of 15 centipoises, containing 2% water, were dissolved in 100 grams of anhydrous solvent consisting of 40% methyl acetate and 60% methyl alcohol by weight and reacted with 0.76% sodium hydroxide calculated on the polyvinyl acetate used. The solution was maintained at 25° C. and the reaction took place rapidly, forming a gel which was broken up by stirring with a mechanical agitator to prevent the formation of a solid mass. The pulverized gel was removed from the reaction vessel and extruded through a perforated plate which completes the pulverization of the gel. The product was dried in warm air to remove the solvent and by analysis was found to be partially hydrolyzed, containing about 40% acetate groups by weight. It was soluble in cold water but commenced to separate out on heating to about 60° C.

Application

A 10% aqueous solution of this partial hydrolysis product was prepared and spread on one side of a sheet of paper and dried to give a coating of about 2 mils in thickness. The sheet was then folded in half to bring the two coated bodies in contact and put into an oven at about 170° C. where it was placed between two hot metal surfaces exerting a pressure of about 10 lbs. per sq. in. After about 20 to 30 seconds of exposure to heat and pressure, the folded sheet was removed and allowed to cool. It was found that the two halves were heat-sealed by the inter-layer of resin to such an extent that any attempt to separate them resulted in tearing of the surface of the paper rather than separating the two surfaces of resin.

A paper container was made including a bottom and a side seal effected similarly to the seal made on the paper as described above. These seals were tough and flexible. Any attempt to separate them resulted in tearing of the surface of the paper, rather than the separation of the paper from the resin or the separation of the two surfaces of resin.

Example II

Using the same procedure as in Example 1 above but raising the percentage alkali to 0.78%, we obtained a partial hydrolysis product containing about 30% acetate groups by weight, which was soluble in both hot and cold water. A 10% water solution of this resin, containing 30% glycerol based on the weight of resin, was coated on paper as described in Example 1. After drying, the coated surface was heat-sealed at between 180° C. and 190° C. for about 15 seconds. A paper container was made at the same time having the bottom and side sealed with this resin. The seals were strong and elastic and could be bent or folded without cracking or without loss of adhesion at the seams.

Example III

The procedure of Example I was followed except for the amount of sodium hydroxide, which was dropped to 0.69%. The partial hydrolysis product formed contained 45% acetate groups by weight and was soluble in cold water.

Example IV

The procedures of Examples I and III were repeated, using up to about 30% of plasticizer. The plasticizers used were glycerine and monoacetin. Paper and fabric were coated with the plasticized resins substantially as described above and dried in a current of warm air. The films were flexible and elastic and adhered strongly to the surface. Heat-sealing tests were carried out on each resin containing plasticizer by substantially the methods already described. The heat-sealing temperatures were slightly lower due to the plasticizer, but in every case the seal was perfect. Containers with bottom and side seams heat-sealed with this resin were prepared and tested. In the case of the paper container, we were unable to pull the seams apart without tearing of the surface of the paper, leaving the heat-seal substantially intact.

Example V

To regenerated cellulose sheet which had not been moisture proofed and before drying, was applied a coating as in Example 4. The product resulting was a transparent, heat-sealable coated sheet in which the coating was permeable to moisture vapour similarly to the base material.

*Advantages*

From the foregoing, the advantages of a sealable product according to the present invention will be apparent. Among these are:

Containers made according to the invention, and having their inner surfaces coated with partially hydrolyzed polyvinyl acetate are particularly suitable for oleaginous materials. The resin is non-toxic, and does not impart taste or odour to the contents.

The strength and durability of the bond.

The satisfactory environment under which the product is manufactured, for instance, the ease with which the coating may be applied; the ease with which the bond can be effected; and, the elimination of complicated solvent recovery apparatus necessary with other types of adhesive materials.

It will, however, be understood that, without departing from the spirit of the invention or the scope of the claims, various modifications may be made in the specific expedients described. The latter are illustrative only and not offered in a restricting sense.

The sub-titles used throughout the specification are merely to simplify reference thereto and should otherwise be disregarded.

We claim:

1. A container of sheet cellulosic material, closely juxtaposed areas of said sheet material being bonded together by a fused layer of a partially hydrolyzed polyvinyl acetate resin having a polyvinyl acetate content within the range from 20% to 50% by weight to form a bond between said sealing areas having an adhesive strength such that stresses tending to separate the united parts cause tearing of the material of said parts in preference to rupture of said bond.

2. A method of making a bonded article having sealing areas of sheet cellulosic material, comprising, applying to said sealing areas a coating of water-soluble fusible partially hydrolyzed polyvinyl acetate resin having a polyvinyl acetate content within the range from 20% to 50% by weight, drying the coating, juxtaposing dry coated sealing areas, and applying sufficient heat and pressure to form a bond between said juxtaposed areas having an adhesive strength such that stresses tending to separate the bonded parts cause tearing of the material of said parts in preference to rupture of said bond.

3. In a method of making a bondable article, the steps of coating sealing areas of cellulosic sheet material forming a part thereof with an aqueous solution of a water-soluble fusible partially hydrolyzed polyvinyl acetate resin having a polyvinyl acetate content within the range from 20% to 50% by weight and drying the coating to provide a layer capable of forming a bond between respective sealing areas having an adhesive strength such that stresses tending to separate the bonded parts cause tearing of the material of said parts in preference to rupture of said bond.

4. A container of sheet cellulosic material, closely juxtaposed areas of said sheet material being bonded together by a fused layer of a partially hydrolyzed polyvinyl acetate resin having a polyvinyl acetate content within the range from 25 to 35% by weight to form a bond between said sealing areas having an adhesive strength such that stresses tending to separate the united parts cause tearing of the material of said parts in preference to rupture of said bond.

5. A method of making a bonded article having sealing areas of sheet cellulosic material, comprising, applying to said sealing areas a coating of water-soluble fusible partially hydrolyzed polyvinyl acetate resin having a polyvinyl acetate content within the range from 25 to 35% by weight, drying the coating, juxtaposing dry coated sealing areas, and applying sufficient heat and pressure to form a bond between said juxtaposed areas having an adhesive strength such that stresses tending to separate the bonded parts cause tearing of the material of said parts in preference to rupture of said bond.

6. In a method of making a bondable article, the steps of coating sealing areas of cellulosic sheet material forming a part thereof with an aqueous solution of a water-soluble fusible partially hydrolyzed polyvinyl acetate resin having a polyvinyl acetate content within the range from 25 to 35% by weight and drying the coating to provide a layer capable of forming a bond between respective sealing areas having an adhesive strength such that stresses tending to separate the bonded parts cause tearing of the material of said parts in preference to rupture of said bond.

GEORGE OSMAN MORRISON.
THOMAS PATTON GLADSTONE SHAW.

REFERENCES CITED

The following references are of record in the file of this patent:

UNITED STATES PATENTS

| Number | Name | Date |
|---|---|---|
| 2,399,338 | Ford | Apr. 30, 1946 |
| 2,263,015 | Seel | Nov. 18, 1941 |
| 2,306,400 | Menzel | Dec. 29, 1942 |
| 2,310,292 | Humphner | Feb. 9, 1943 |
| 2,273,452 | Snyder | Feb. 17, 1942 |
| 2,301,664 | Eggert | Nov. 10, 1942 |
| 2,135,075 | Herrmann | Nov. 1, 1938 |
| 2,250,674 | McBurney | July 29, 1941 |
| 2,250,681 | Schwartz | July 29, 1941 |
| 2,328,844 | Osterhof | Sept. 7, 1943 |
| 2,251,296 | Shipp | Aug. 5, 1941 |
| 2,341,398 | Strother | Nov. 8, 1944 |

FOREIGN PATENTS

| Number | Country | Date |
|---|---|---|
| 494,929 | Great Britain | Nov. 3, 1938 |